(12) United States Patent  
Stolcke et al.

(10) Patent No.: US 9,324,320 B1  
(45) Date of Patent: Apr. 26, 2016

(54) NEURAL NETWORK-BASED SPEECH PROCESSING

(71) Applicant: Microsoft Technology Licensing, LLC, Redmond, WA (US)

(72) Inventors: Andreas Stolcke, Berkley, CA (US); Malcolm Slaney, Palo Alto, CA (US); Sree Harsha Yella, Valais (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/504,722

(22) Filed: Oct. 2, 2014

(51) Int. Cl.  
 *G10L 15/16* (2006.01)  
 *G10L 15/06* (2013.01)

(52) U.S. Cl.  
 CPC ............... *G10L 15/063* (2013.01); *G10L 15/16* (2013.01)

(58) Field of Classification Search  
 CPC .............. G06F 17/3069; G06K 9/0008; Y10S 707/99931; Y10S 707/99932; Y10S 707/99933  
 USPC .......... 704/231, 232, 273, E17.009, 270, 235, 704/258, E21.02, 243, 205, 228, E15.004, 704/E15.039; 382/190  
 See application file for complete search history.

(56) References Cited

U.S. PATENT DOCUMENTS

| | | | |
|---|---|---|---|
| 5,375,173 A | 12/1994 | Sanada et al. | |
| 5,461,697 A | 10/1995 | Nishimura et al. | |
| 5,737,485 A | 4/1998 | Flanagan et al. | |
| 6,366,885 B1 * | 4/2002 | Basu ....................... | G11B 27/10 704/235 |
| 6,567,775 B1 * | 5/2003 | Maali ....................... | G10L 17/10 704/231 |
| 7,082,394 B2 * | 7/2006 | Burges ................. | G06K 9/4647 382/190 |
| 2014/0195236 A1 | 7/2014 | Hosom et al. | |

FOREIGN PATENT DOCUMENTS

EP 0369485 B1 2/1995

OTHER PUBLICATIONS

Heck, et al., "Robustness to Telephone Handset Distortion in Speaker Recognition by Discriminative Feature Design", In Journal of Speech Communication—Speaker recognition and its commercial and forensic applications, vol. 31, Isssue 2-3, Jun. 2000, 12 pages.

Murty, et al., "Combining Evidence from Residual Phase and MFCC Features for Speaker Recognition", In IEEE Signal Processing Letters, vol. 13 Issue 1, Jan. 2006, pp. 52-55.

Pawar, et al., "Speaker Identification System Using Wavelet Transformation and Neural Network", In International Conference on Advances in Computational Tools for Engineering Applications, Jul. 15, 200, pp. 228-232.

(Continued)

*Primary Examiner* — Charlotte M Baker  
(74) *Attorney, Agent, or Firm* — Alin Corie; Sandy Swain; Micky Minhas (57) ABSTRACT

Pairs of feature vectors are obtained that represent speech. Some pairs represent two samples of speech from the same speakers, and other pairs represent two samples of speech from different speakers. A neural network feeds each feature vector in a sample pair into a separate bottleneck layer, with a weight matrix on the input of both vectors tied to one another. The neural network is trained using the feature vectors and an objective function that induces the network to classify whether the speech samples come from the same speaker. The weights from the tied weight matrix are extracted for use in generating derived features for a speech processing system that can benefit from features that are thus transformed to better reflect speaker identity.

20 Claims, 8 Drawing Sheets

(56) References Cited

OTHER PUBLICATIONS

Mary, et al., "Extraction and Representation of Prosodic Features for Language and Speaker Recognition", In Journal of Speech Communication, vol. 50, Issue 10, Oct. 2008, pp. 782-796.
Pelecanos, et al., "Feature Warping for Robust Speaker Verification", In Proceedings of a Speaker Odyssey, The Speaker Recognition Workshop, Jun. 18, 2001, 6 pages.
Drygajlo, et al., "Speaker Verification in Noisy Environements with Combiined Spectral Subtraction and Missing Feature Theory", In Proceedings of the IEEE International Conference on Acoustics, Speech and Signal Processing, vol. 01, May 12, 1998, pp. 121-124.
Phan, et al., "Speaker Identification Using Neural Networks and Wavelets", In IEEE Engineering in Medicine and Biology Magazine, vol. 19, Issue 1, Jan. 2001, pp. 92-101.
Wooters, et al., "The ICSI RT07s Speaker Diarization System", In Book Multimodal Technologies for Perception of Humans, Jan. 1, 2008, 11 pages.

* cited by examiner

NEURAL NETWORK-BASED SPEECH PROCESSING

BACKGROUND

Computer systems are currently in wide use. Some such computer systems receive audio input signals and perform speech processing to generate a speech processing result.

By way of example, some speech processing systems include speech recognition systems that receive an audio signal and, in general, recognize speech in the audio signal and transcribe the speech into text. They can also include audio indexing systems that receive audio signals and index various characteristics of the signal, such as a speaker identity, subject matter, emotion, etc. The speech systems can also include speech understanding (or natural language understanding) systems, that receive an audio signal, identify the speech in the signal, and identify an interpretation of the content of that speech. The speech systems can also include speaker recognition systems. Such systems receive an audio input stream and identify the various speakers that are speaking in the audio stream. Another function often performed is speaker segmentation and tracking, also known as speaker diarization. Speaker diarization is the process of partitioning an input audio stream into homogeneous segments according to speaker identity. It uses a combination of speaker segmentation and speaker clustering. Speaker segmentation finds speaker change points in the audio stream, and speaker clustering groups together speech segments based on speaker characteristics.

By way of example, for a variety of purposes, audio streams containing multiple speakers are often partitioned into segments containing only a single speaker, and non-continuous segments coming from the same speaker are co-indexed. Speaker recognition systems are used to match a speaker-homogeneous section of audio against a speaker model. Audio indexing systems enable retrieval of portions of a meeting recording (or other multiple-speaker recording) by speaker identity. Speech recognition systems can be adapted to characteristics of the specific speaker using this information. Automatic transcription systems can use this information to attribute certain portions of the transcript to the proper speakers, and speech understanding systems can be used to interpret the meaning of an utterance, based upon the identity of the speaker that made the utterance.

In performing these types of speech processing tasks, speech systems must accommodate a relatively high degree of variability within the speech of a given speaker. In addition, the speech signal can often be distorted by extrinsic factors, such as background noise and reverberation, as well as room acoustics, among others. This can add to the difficulty in making comparisons of audio samples for assessing speaker identity.

Current speaker diarization systems extract a fixed, human-designed set of features (which may typically be Mel cepstrum, or MFCC features, etc.) from the audio stream, train Gaussian mixture models for segments of the audio and then cluster the segments according to the similarity of their associated Gaussian distributions. Therefore, speaker similarity is measured indirectly based on similarity of the underlying, predetermined features.

The discussion above is merely provided for general background information and is not intended to be used as an aid in determining the scope of the claimed subject matter.

SUMMARY

Pairs of feature vectors are obtained that represent speech. Some pairs represent two samples of speech from the same speakers, and other pairs represent two samples of speech from different speakers. A neural network feeds each feature vector in a sample pair into a separate bottleneck layer, with a weight matrix on the input of both vectors tied to one another. The neural network is trained using the feature vectors to perform a designated function, and after training, the weights from the tied weight matrix are extracted for use in generating features for a speech system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
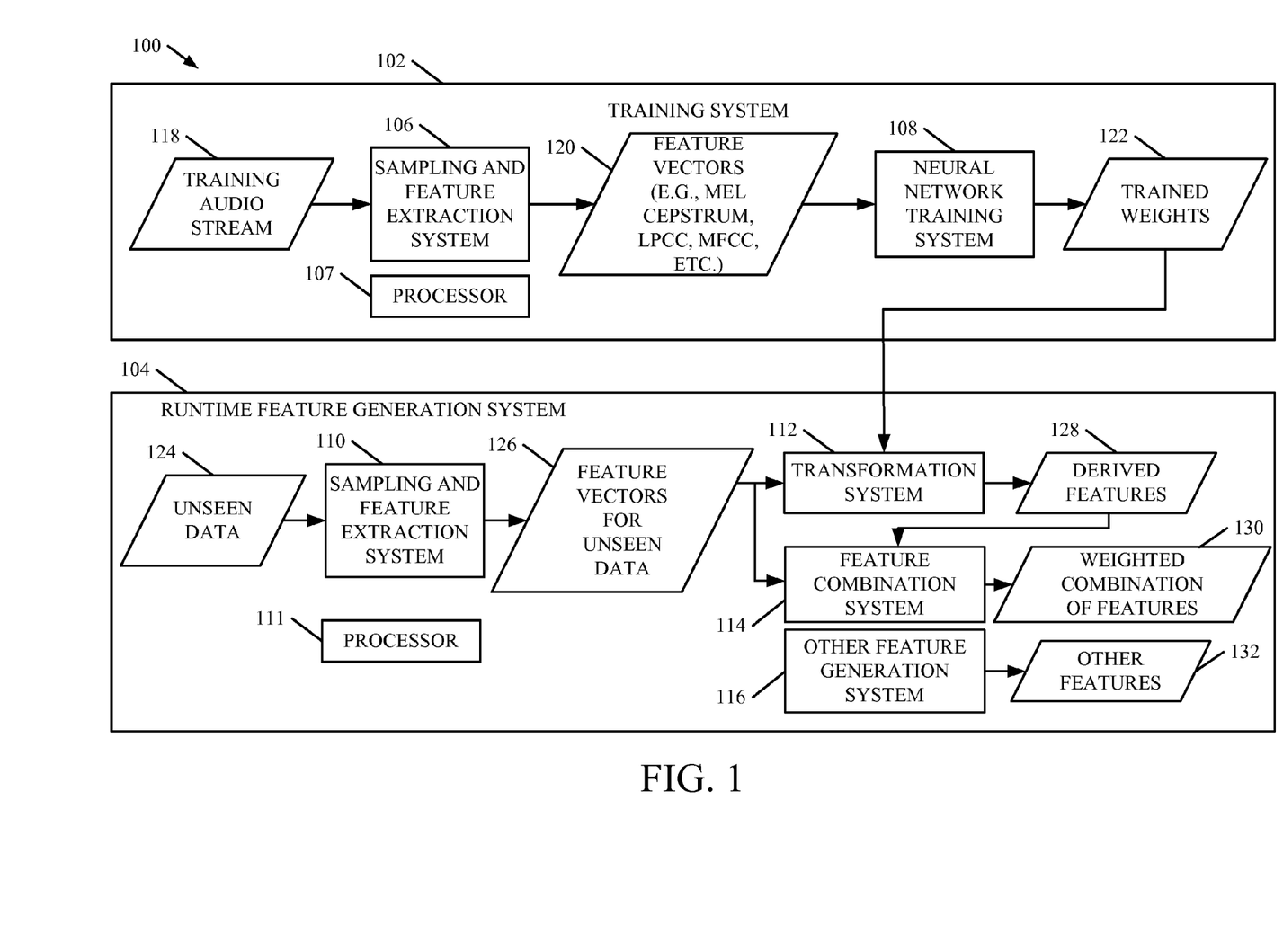
FIG. 1 is a block diagram of one example of a speech processing architecture.

FIG. 1 is a block diagram of one example of a speech processing architecture 100. Architecture 100 illustratively includes training system 102 and runtime feature generation system 104. Training system 102 illustratively includes sampling and feature extraction system 106, processor 107, and neural network training system 108. Runtime feature generation system illustratively includes sampling feature extraction system 110 (which can be the same as system 106 or different), processor 111 (which can be the same as, or different from, processor 107), as well as transformation system 112. It can include feature combination system 114, and other feature generation system 116 as well.

Before describing the operation of architecture 100 in more detail, a brief overview of some of the items in architecture 100, and their operation, will first be provided. Sampling and extraction system 106 illustratively receives training audio stream 118 and samples audio information in stream 118 and extracts a feature vector for each of the samples. It illustratively outputs the feature vectors 120, which can illustratively be Mel-frequency cepstral coefficients (MFCC) vectors, among others. Those feature vectors are illustratively provided to neural network training system 108, which trains a neural network (one example of which is described in greater detail below with respect to FIG. 3) and extracts trained weights 122 from a weight matrix between the input of the neural network and a first, bottleneck layer, of the neural network. Those trained weights are then provided to runtime feature generation system 104, where they can be used to generate a variety of different sets of features that can be used during runtime speech processing.

During runtime, runtime feature generation system 104 illustratively receives unseen data 124. Sampling and feature extraction system 110 illustratively samples and extracts features from the unseen data 124. The features are represented by feature vectors 126 for the unseen data. In one example, the trained weights 122 output by neural network training system 108 are provided to transformation system 112. They are used to transform the feature vectors for the unseen data 126 to obtain derived features 128. The derived features 128 can be used in speech processing, by themselves, or with other features. For instance, they can be used in addition to feature vectors 126. They can also be provided to feature vector combination system 114 where they are used to generate a weighted combination of features 130, that represent a weighted combination of derived features 128 and features in feature vectors 126. Features 130 can also illustratively represent feature vectors 126, weighted by derived features 128, or otherwise.

Runtime feature generation system 104 can also generate other features 132 using other feature generation system 116. Some of the other features are described in greater detail below.

Figure 2:
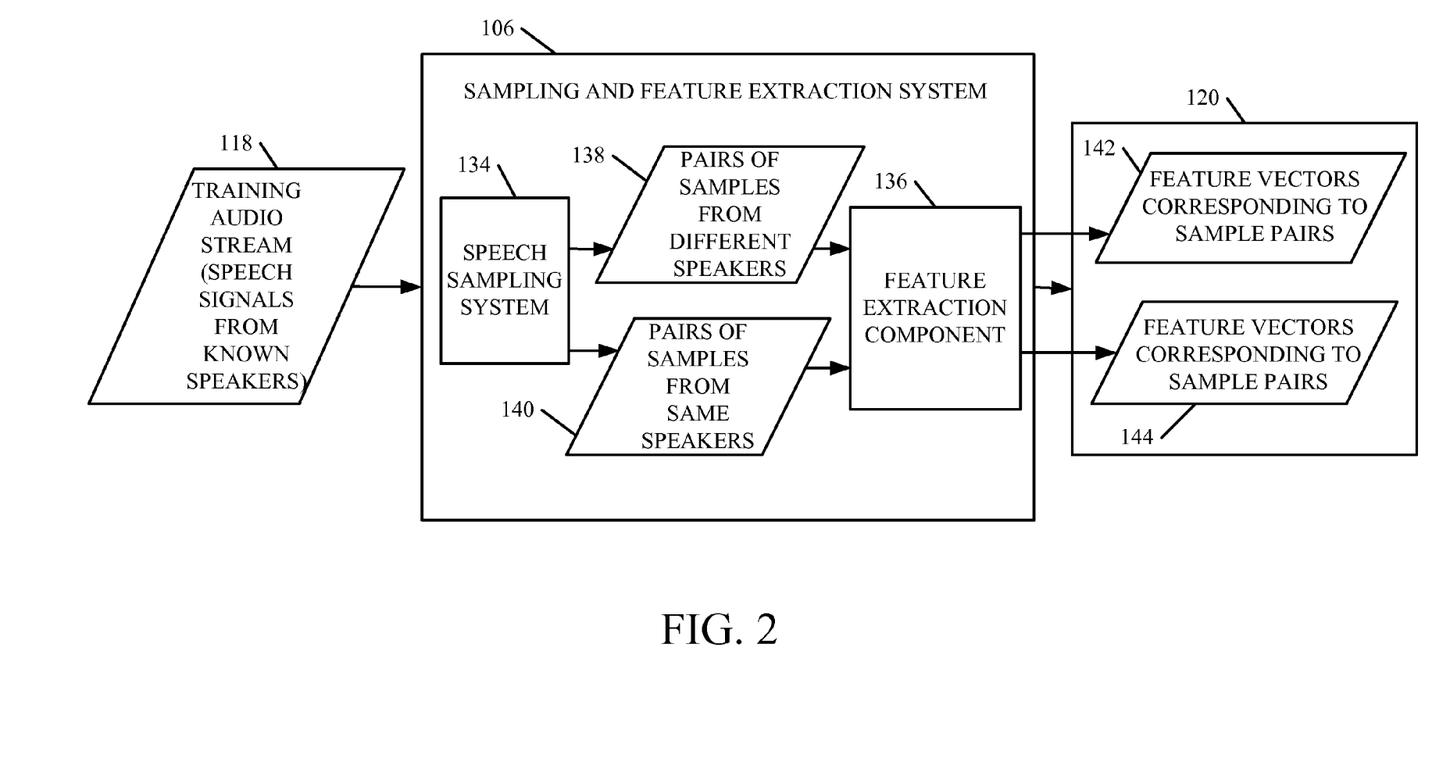
FIG. 2 is a block diagram showing one example of a sampling and feature extraction system (shown in FIG. 1) in more detail.

FIG. 2 is a block diagram illustrating one example of sampling and feature extraction system 106, in more detail. The example shown in FIG. 2 illustrates that sampling and feature extraction system 106 illustratively includes speech sampling system 134 and feature extraction component 136. Speech sampling system 134 illustratively samples windows of speech in the training audio stream 128, which can represent speech signals from known speakers. System 134 illustratively generates pairs of samples from different speakers 136 and pairs of samples from the same speakers 138. In one example, samples 136 and 138 are output in approximately the same proportion. Of course, this is only one example.

Feature extraction component 136 then extracts features (represented in feature vectors 120) from the pairs of samples 136 and 138. The feature vectors 120 illustratively include feature vectors 142, which correspond to the pairs of samples 138 from different speaker, and feature vectors 144, which correspond to the pairs of samples 140 from the same speakers. The pairs of feature vectors 142 and 144 can include, for instance, concatenated MFCC feature vectors, or other feature vectors, of adjacent speech frames.

It will be appreciated that the processing can occur in other orders as well. For instance, the feature vectors can be extracted before the signals are paired with one another. The feature vectors can then be paired as described, instead of the audio signals. This description is provided as an example only.

Figure 3:
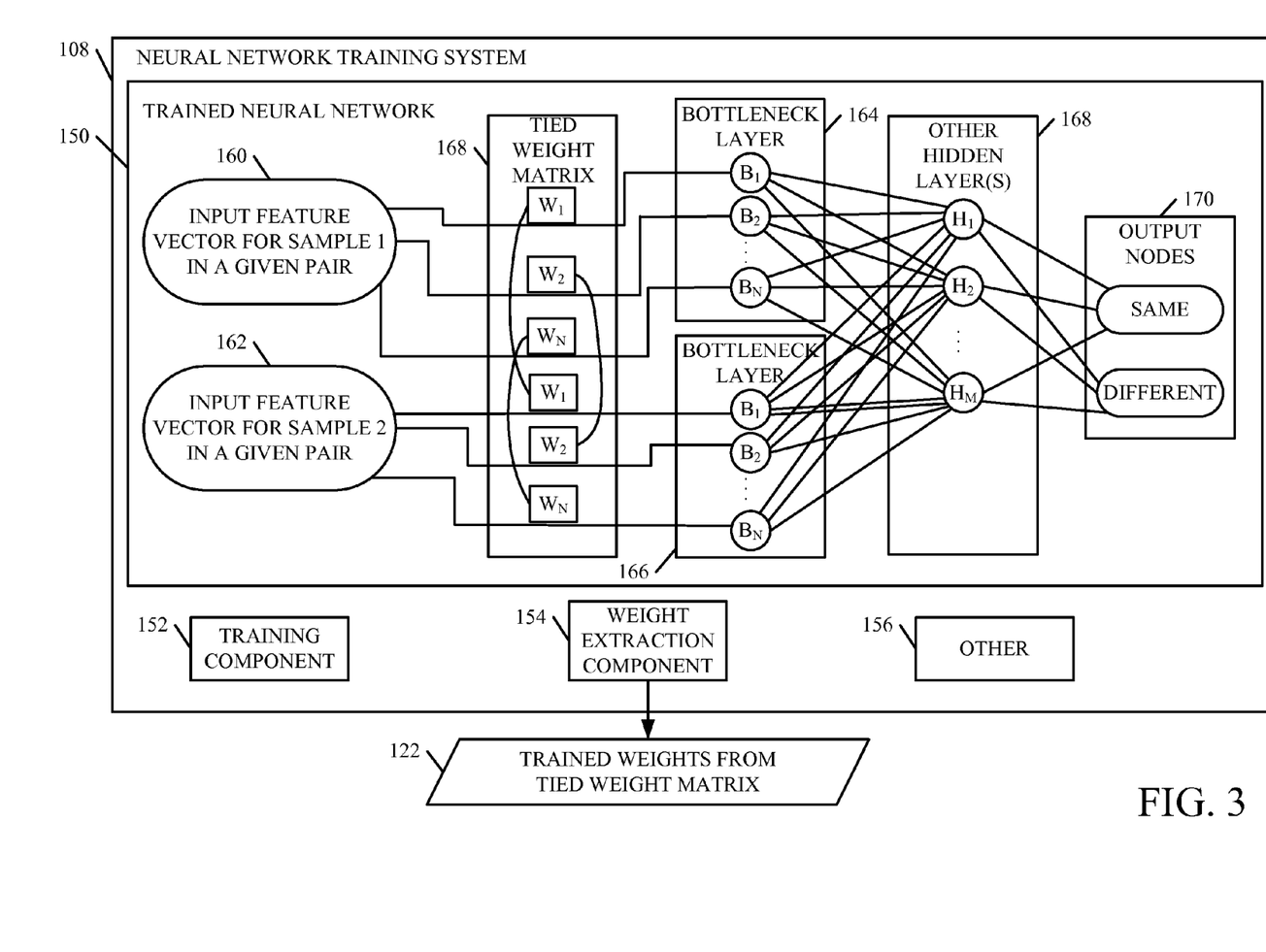
FIG. 3 is a block diagram showing one example of a neural network training system (shown in FIG. 1) in more detail.

FIG. 3 is a block diagram showing one example of a neural network training system 108, in more detail. Neural network training system 108 illustratively includes neural network 150, training component 152, weight extraction component 154, and it can include other items 156 as well. Trained neural network 150 illustratively has an architecture that receives an input feature vector 160, for a first sample of a given pair of feature vectors, and an input feature vector 162 for the second sample in the given pair of feature vectors. Feature vectors 160 and 162 illustratively make up a pair of either feature vectors 142 from different speakers, or feature vectors 144 from the same speaker (shown in FIG. 2). Each sample feature vector 160 and 162 is provided to a separate bottleneck layer 164 and 166, respectively, in neural network 150, through a weight matrix 168. Bottleneck layers 164 and 166 operate as a dimension reduction layer in neural network 150 and each include a set of nodes $B_1$-$B_N$. The adaptive weights on the connections between the inputs 160 and 162, and the nodes of the bottleneck layers 164 and 166, are illustratively tied to one another. Therefore, for instance, weight w1 that is on the connection between the input feature vector 160 and the node B1 in bottleneck layer 164 is illustratively tied to weight w1 that is on the connection between the input feature vector 162 and the node B1 in bottleneck layer 166. Weights w2-wn in weight matrix 168 are illustratively tied in the same ways.

The output of the bottleneck layers 164 and 166 are illustratively provided to a set of additional hidden layers 168 in neural network 150. Each hidden layer 168 illustratively includes its own set of nodes (illustrated as nodes H1-Hm). The hidden layers 168 eventually feed into a set of output nodes 170 that include a SAME node 172 and a DIFFERENT node 174. Nodes 172 and 174 encode whether the speakers from which the inputs 160 and 162 were drawn are the same speaker or different speakers.

Figure 4:
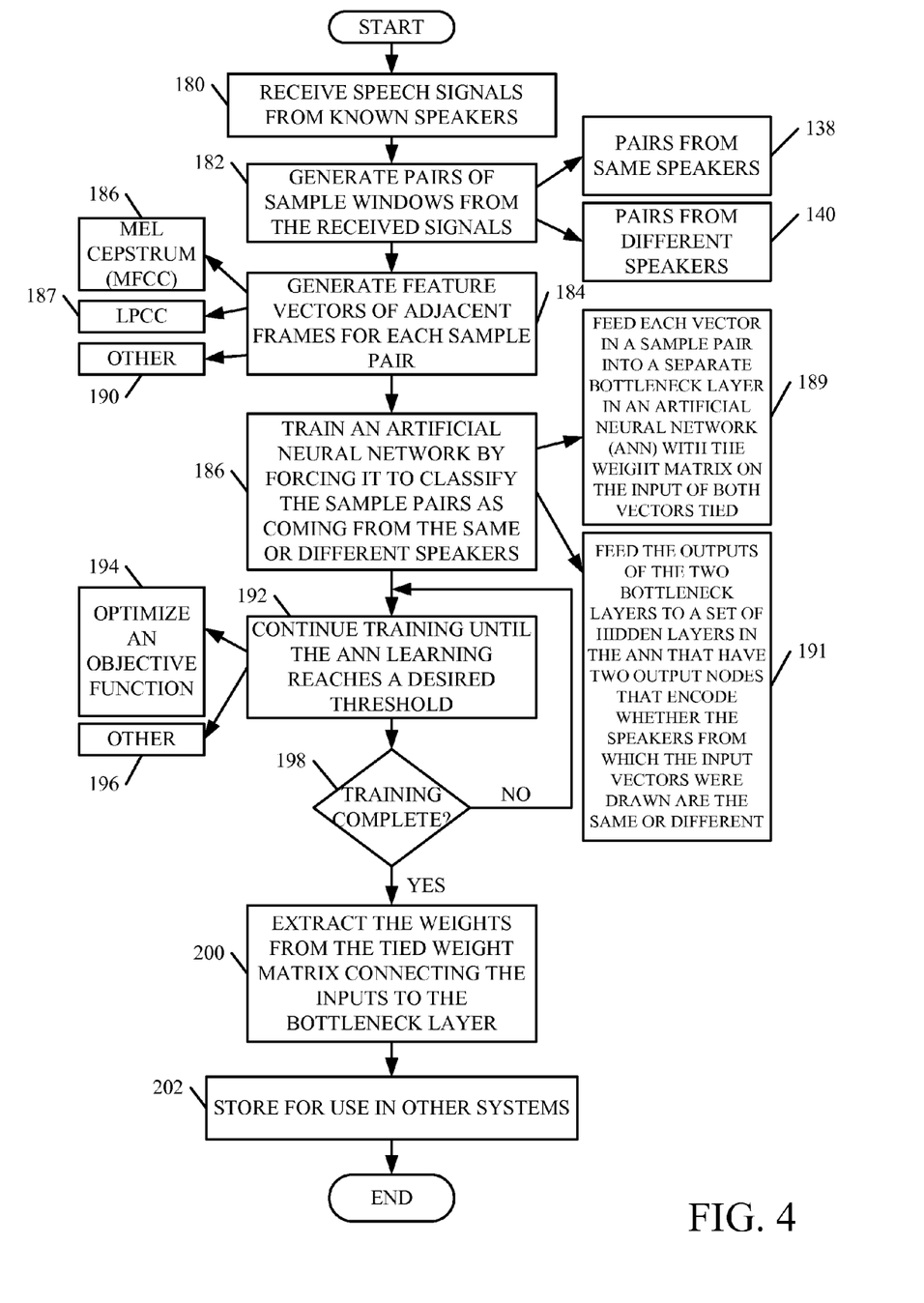
FIG. 4 is a flow diagram illustrating one example of the operation of a training system (shown in FIG. 1).

FIG. 4 is a flow diagram illustrating one example of the operation of training system 102 in training neural network 150 to generate trained weights 122. FIGS. 1-4 will now be described in conjunction with one another.

Training system 102 first receives the training audio stream 118 (or other training data stream) representing speech signals from known speakers. This is indicated by block 180 in FIG. 4. Speech sampling system 134 then generates pairs of sample windows from the received signals. This is indicated by block 182. The pairs illustratively include pairs 138 from the same speaker, and pairs 140 from different speakers. As mentioned above, these can be provided in roughly equal proportions, as an example.

Feature extraction component 136 then generates feature vectors of adjacent frames for each sample pair. This is indicated by block 184. The feature vectors can be Mel cepstrum features 186 (MFCCs), linear predictive cepstral coefficients (LPCCs) 187, among a wide variety of other features 190.

Training component 152 in neural network training system 108 then trains artificial neural network (ANN) 150 by forcing it to classify the sample pairs as coming from either the same or different speakers, based upon the known speakers corresponding to those samples. This is indicated by block 186. In one example, the training component 152 feeds each vector 160-162 in a sample pair into the separate bottleneck layers 164 and 166 through the weight matrix 168 on the input of both vectors 160-162 tied to one another. This is indicated by block 189 in FIG. 4.

Neural network 150 also illustratively feeds the outputs of the two bottleneck layers 164 and 166 to a set of hidden layers 168 in the neural network that eventually feed into the output nodes 170 that encode whether the speakers from which the input vectors are drawn are the same or different. This is indicated by block 191.

In the example illustrated in FIG. 3, training component 152 illustratively continues training, by feeding the pairs of feature vectors (for same and different speakers) into the neural network 150 until the neural network learning reaches a desired threshold. This is indicated by block 192. For instance, training component 152 illustratively uses an objective function of the outputs and trains weights in the neural network to optimize the objective function. Component 152 can train neural network 150 until the learning no longer improves, or until the improvement is below a given threshold. Using a procedure to modify weights to optimize an objective function is indicated by block 194. The objective function can be any of a wide variety of objective functions.

For instance, it can be an objective function of a binary or discrete classifier, among a wide variety of others. Continuing training until the learning reaches a desired threshold can be done in other ways as well, and this is indicated by block 196.

Training component 152 eventually determines that training is complete. This is indicated by block 198 in FIG. 3. When training is complete, weight extraction component 154 extracts the weights w1-wn from the tied weight matrix 168 connecting the inputs 160-162 to the bottleneck layers 164-166. Extracting the weights is indicated by block 200 in the flow diagram of FIG. 4. Those weights illustratively comprise the trained weights 122. They are stored or otherwise output for use in generating features in a variety of different speech processing systems. This is indicated by block 202.

Figure 5:
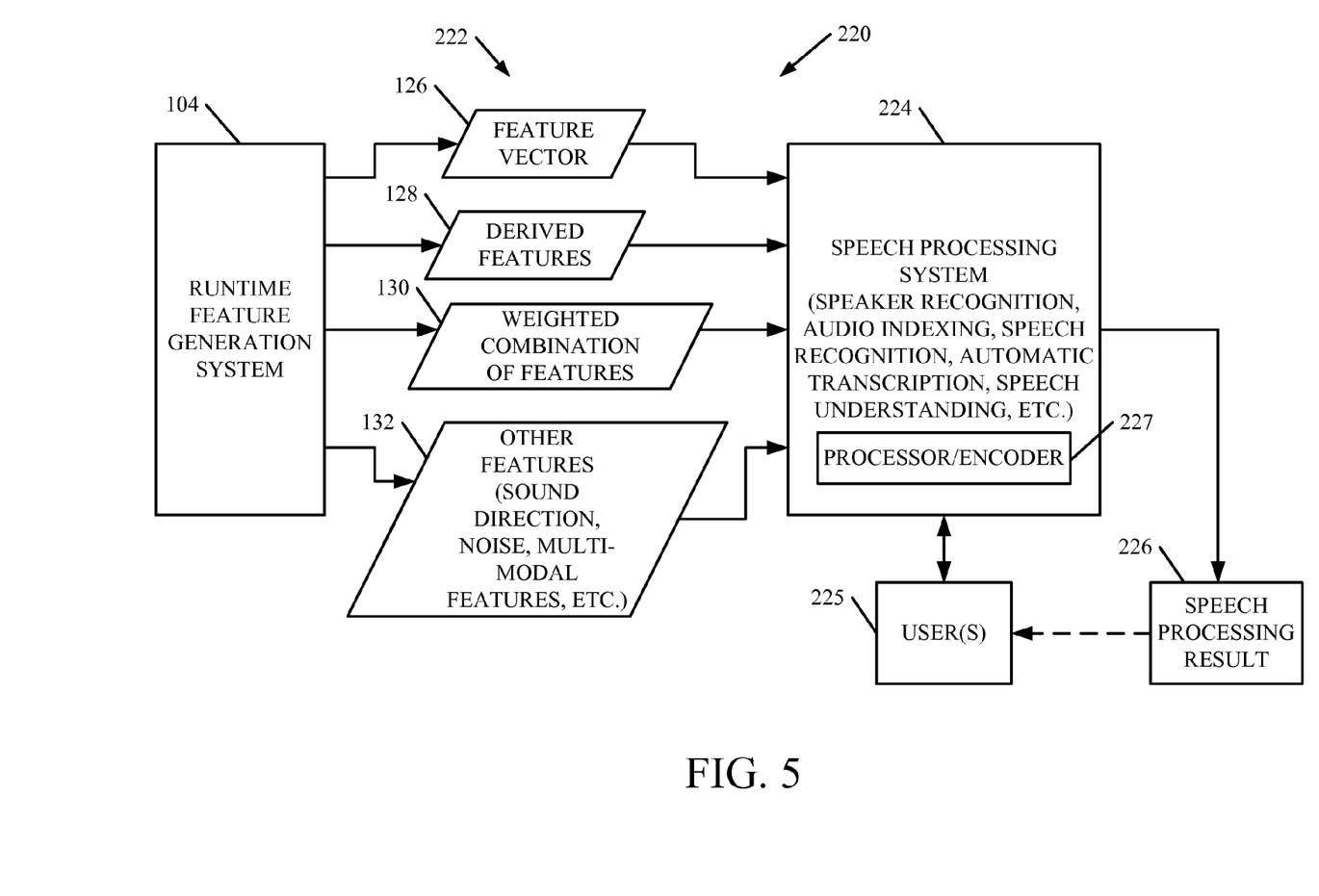
FIG. 5 is a block diagram of one example of a speech processing system that uses derived features.

FIG. 5 is a block diagram of one example of a runtime architecture 220. Runtime architecture 220 illustratively receives a variety of different feature vectors 222 from runtime feature generation system 104. It provides them to speech processing system 224, which is used by one or more users 225. Speech processing system 224 can include a processor or encoder 227 and it can also be a wide variety of different types of speech processing systems, that performs a variety of different types of speech processing. For instance, it can be a speaker recognition system, and audio indexing system, a speech recognition system, an automatic transcription system, a speech understanding system, among a wide variety of others.

System 224 receives runtime features 222 that are extracted or derived from runtime data and generates a speech processing result 226. For instance, when speech processing system 224 is a speaker recognition system, speech processing result 226 can identify different coherent sections of audio in the runtime data that is received, matched against different speakers. Where it is an audio indexing system, it indexes speech according to speaker identity, so that it can be retrieved at a later time. Where it is a speech recognition system, it adapts to the particular characteristics of the speech derived from the training process to recognize speech. Where it is an automatic transcription system, speech processing result 226 attributes transcript sections to the appropriate speakers. Where it is a speech understanding system, speech processing result 226 provides an interpreted meaning of an utterance, based upon who made the utterance. These, of course, are examples only.

In any case, the vectors 222 that are received by speech processing system 224 can include the same types of feature vectors for the unseen data as were described as feature vectors 126 with respect to FIG. 1. They can also include the derived features 128 that are also described above. In addition, they can include the weighted combination of features 138, or they can include a wide variety of other features 132.

The other features 132 can be features that are indicative of the acoustics of a room where the signal is gathered. Features 132 can be features that are indicative of sound direction. They can be features obtained from different kinds or sources of background noise. They can also be multi-modal features. For instance, where the speech detection system includes cameras, the multi-modal features may be features derived from visual information that indicate whether a given speaker's lips are moving, whether the given speaker is facing a microphone, among others.

Figure 6:
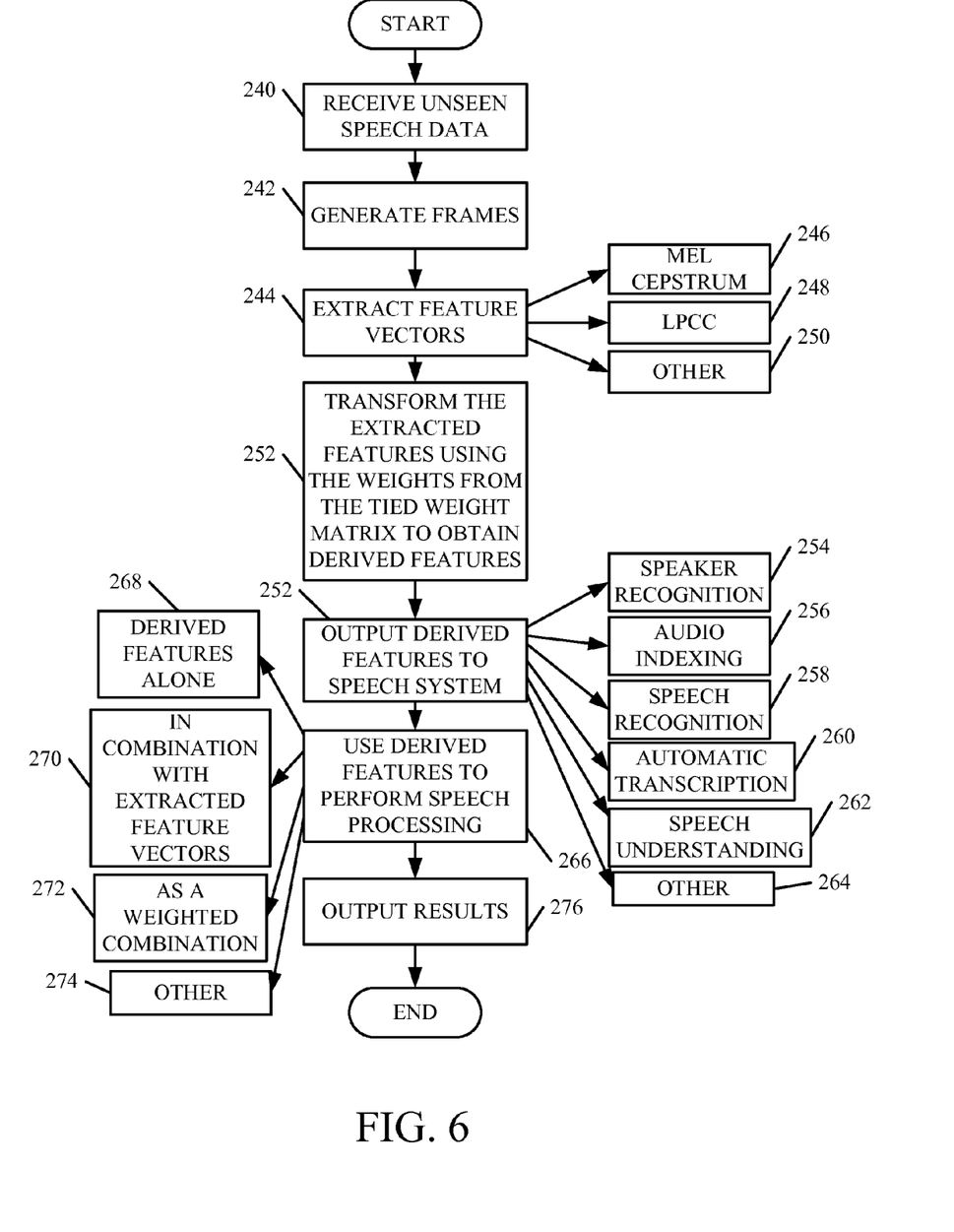
FIG. 6 is a flow diagram illustrating one example of the operation of the system shown in FIG. 5 in performing speech processing.

FIG. 6 is a flow diagram illustrating one example of the operation of architecture 220. Architecture 220 first receives unseen speech data. This is indicated by block 240 in FIG. 6. It then generates frames and extracts features corresponding to the frames of the speech data. This is indicated by blocks 242 and 244. Again, the feature vectors can include Mel-scale cepstrum features (MFCCs) 246, LPCC features 248, or a wide variety of other acoustic or non-acoustic features 250.

System 224 then uses transformation system 112 (described above with respect to FIG. 1) to transform the extracted features 126 using weights from the tied weight matrix to obtain the derived features 128. This is indicated by block 252 in FIG. 6. The derived features 128 can be output to speech processing system 224, as indicated by block 252. They can be used to perform speaker recognition 254, audio indexing 256, speech recognition 258, automatic transcription 260, speech understanding 262, or a wide variety of other speech processing 264. Using the features to perform the speech processing discussed above is indicated by block 266.

In doing so, system 224 can use the derived features 128 alone, as indicated by block 268. It can use the derived features 128 in combination with the extracted feature vectors 126. This is indicated by block 270. It can combine the features to obtain a weighted combination of features 126 and 128. For instance, feature vectors 126 can be combined with the newly derived features 128 by forming a weighted combination of the Gaussian likelihoods (as used in clustering) from the two feature streams. The weighted combination is indicated by block 130. It can combine the features with other features 132, as indicated by block 272. Of course, it can use the features in other ways 274 as well. Speech processing system 224 ultimately outputs the speech processing result 226. This is indicated by block 276.

Before proceeding with the description, a number of things should be noted. It will first be noted that the present discussion has proceeded with respect to training neural network 150 by modifying weights to optimize an objective function of the outputs to recognize speech from the same speaker or different speakers, and then to extract the input weights from the tied weight matrix 168 for use in generating derived features 128. However, the present system can be used in a wide variety of other ways as well. For instance, instead of training neural network 150 to recognize whether pairs of input vectors are from the same or different speakers, it can also be trained to recognize whether non-acoustic input features correspond to a given speaker's lips moving or not moving. It can be trained to identify whether the pairs of features correspond to noise or speech. It can be trained to separate different kinds of background noise. Thus, the weights that are extracted from the tied weight matrix 168 can be used in a variety of different types of systems, and not just a system that is used to recognize whether speech is coming from the same or different speakers. These are examples only.

In addition, it should be noted that the features can be continuously adapted to more accurately identify given speakers. For instance, in an application where there may be meetings of the same people, relatively frequently, those people can be identified and the derived features can be generated from initial meetings, and adapted using speech data from later meetings, to improve the accuracy of the speaker diarization (or other) system. These types of adaptations provide significantly improved accuracy.

It can thus be seen that the present description provides a wide variety of technical advantages. It provides a way to derive new features that are discriminatively trained to both enhance speaker discrimination and ignore confounding factors that are independent of speaker identity (such as the content of the speech, noise and distortion due to environment or encoding channel, etc.). In one example, this is achieved by training a neural network to perform same/different speaker classification tasks on a set of data with known speaker identities. The network takes the speech samples encoded using features as an input and is forced to represent them through a bottleneck hidden layer. The mapping from the input to the bottleneck layer can be applied to the unseen test data to compute new feature vectors that can be used alone or in conjunction with other features to perform a clustering or classification process.

This produces a useful feature representation in the network, and it can be used in conjunction with speaker diarization clustering algorithms, or a wide variety of other systems. The features can be used in conjunction with other clustering or modeling systems, and they enhance accuracy of those systems. Particularly, they can enhance the ability to tailor a speaker diarization system to a body of training data that is representative of a given application. This is but one example.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays or user interfaces have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
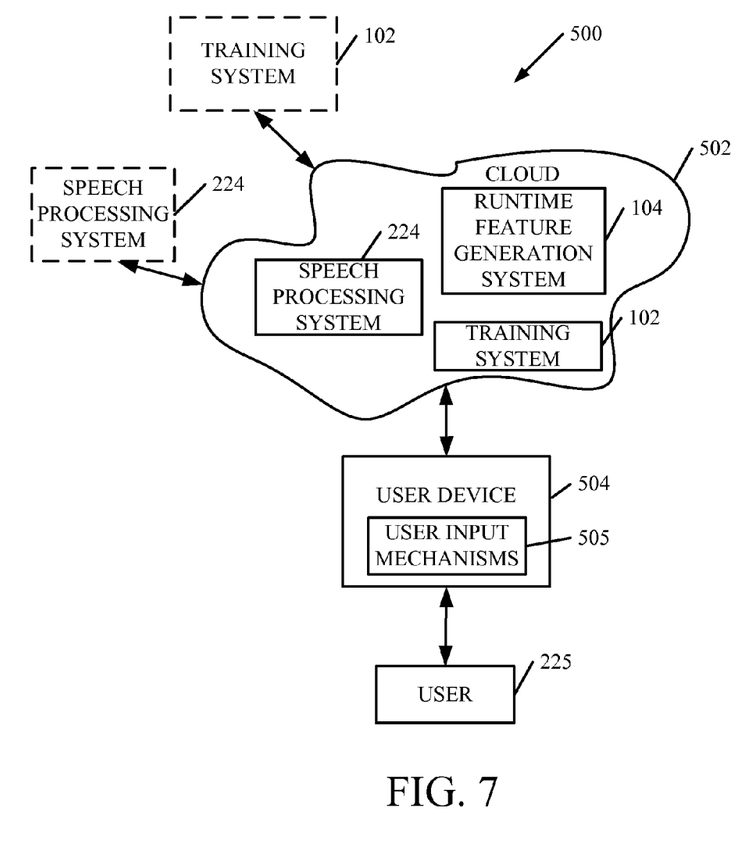
FIG. 7 is a block diagram of one example of a cloud computing architecture.

FIG. 7 is a block diagram of architectures 100 and 220, shown in FIGS. 1 and 5, except that the elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architectures 100 and 220 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIGS. 1 and 5 and they are similarly numbered. FIG. 7 specifically shows that some items can be located in cloud 502 (which can be public, private, or a combination where portions are public while others are private). Therefore, user 225 uses a user device 504 to access those systems through cloud 502, by using user input mechanisms 505 such as user interface displays, microphones, etc.

FIG. 7 also depicts another example of a cloud architecture. FIG. 7 shows that it is also contemplated that some elements of architectures 100 and 220 can be disposed in cloud 502 while others are not. By way of example, training system 102 (or parts of it) can be disposed outside of cloud 502, and accessed through cloud 502. In another example, speech processing system 224 is outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 or 220, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
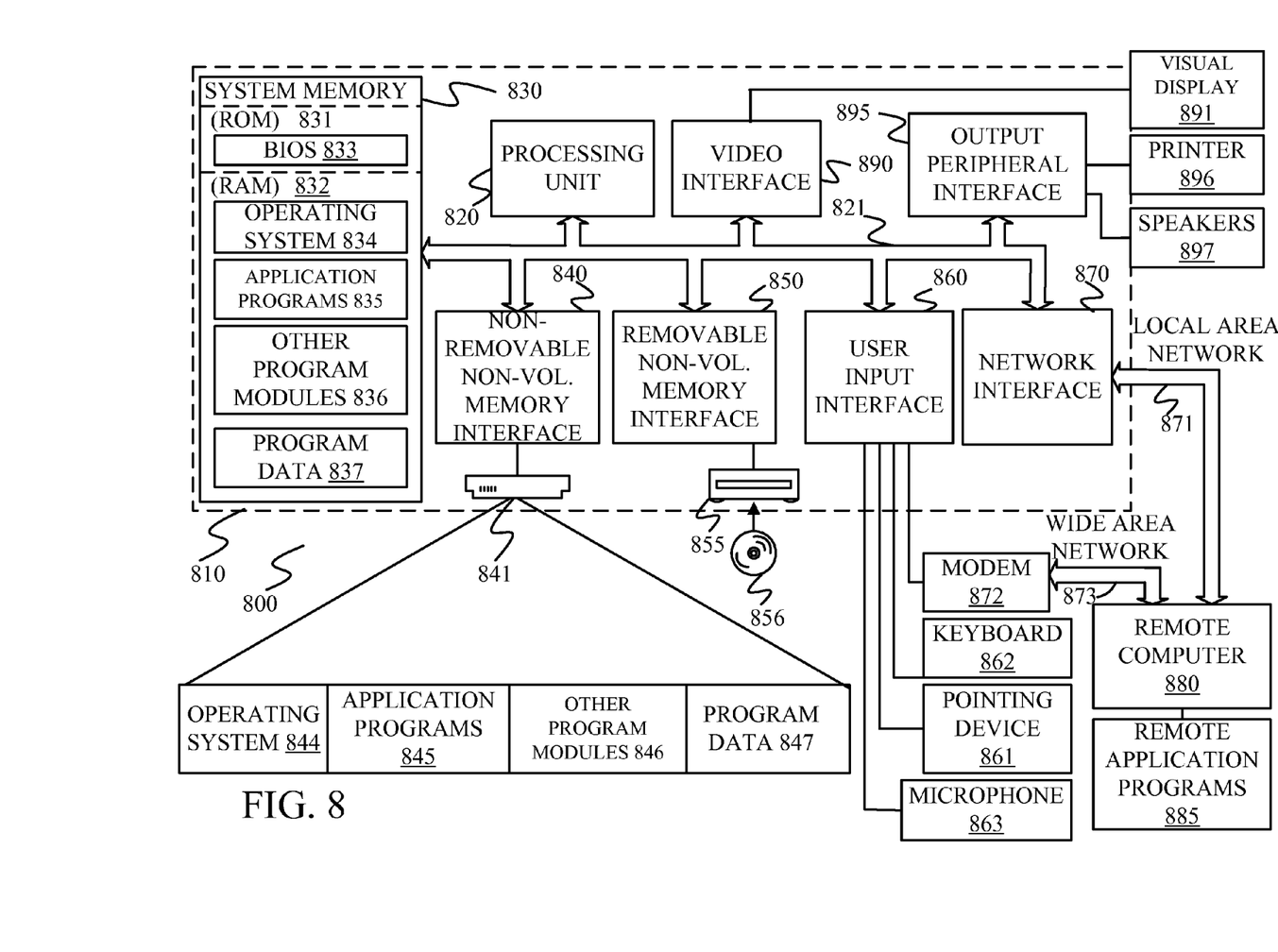
FIG. 8 is a block diagram of one example of a computing environment.

FIG. 8 is one embodiment of a computing environment in which architectures 100 or 220, or parts of them, (for example) can be deployed. With reference to FIG. 8, an example system for implementing some embodiments includes a general-purpose computing device in the form of a computer 810. Components of computer 810 may include, but are not limited to, a processing unit 820 (which can comprise processors 107 or 111), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1-5 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. For instance the examples discussed in the following paragraphs can be combined in any combination of examples. All of this is contemplated herein.

Example 1 is a computing system, comprising:

a feature extraction system configured to extract (or means for extracting) a set of training features from audio training data and generate pairs of feature vectors from a same audio source and pairs of feature vectors from different audio sources; and a neural network training system configured to receive (or means for receiving) the pairs of feature vectors and train a neural network by applying the pairs of feature vectors through a weight matrix, to an input node layer of the neural network, modify the weight matrix based on an objective function of network outputs that indicate whether the pairs of feature vectors are from the same audio source or different audio sources, and to extract weights from the weight matrix and provide the weights to an audio processing system.

Example 2 is the computing system of any or all previous examples wherein the feature extraction system is configured to extract the pairs of feature vectors as feature vectors from speech of known speakers.

Example 3 is the computing system of any or all previous examples wherein the feature extraction system is configured to generate the pairs of feature vectors as pairs of feature vectors from the same speaker and pairs of feature vectors from different speakers.

Example 4 is the computing system of any or all previous examples wherein the input node layer of the neural network comprises:
 a first bottleneck layer (means) having a set of nodes; and
 a second bottleneck layer (means) having a set of nodes.

Example 5 is the computing system of any or all previous examples wherein the weight matrix ties weights on inputs to corresponding nodes of the first and second bottleneck layers together.

Example 6 is the computing system of any or all previous examples wherein the neural network training system comprises:
 a training component that feeds (or means for feeding) the pairs of feature vectors into the neural network by feeding a first feature vector of each of the pairs of feature vectors through the weight matrix into the nodes of the first bottleneck layer and feeding a second feature vector of each of the pairs of feature vectors through the weight matrix into the nodes of the second bottleneck layer.

Example 7 is the computing system of any or all previous examples wherein the training component is configured to train the neural network by forcing an output layer of the neural network to indicate whether the pairs of feature vectors are drawn from speech of the same speaker or different speakers, based on the objective function.

Example 8 is the computing system of any or all previous examples and further comprising:
 a feature generation system configured to apply (or means for applying) the extracted weights to a set of features extracted from unseen speech data to obtain a set of derived features.

Example 9 is the computing system of any or all previous examples and further comprising:
 a speech processing system configured to use (or means for using) the set of derived features in generating a speech processing result corresponding to the unseen speech data.

Example 10 is a speech system, comprising:
 a feature extractor configured to receive (or means for receiving) speech signal data indicative of a speech signal and extract a set of features from the speech signal;
 a feature application system configured to apply (or means for applying) a set of weights, extracted from a weight matrix between an input of a neural network and a bottleneck layer of the neural network, to the set of features to transform the set of features into a set of derived features; and
 an encoder configured to generate (or means for generating) a speech processing result indicative of a characteristic of the speech signal, based on the set of derived features.

Example 11 is the speech system of any or all previous examples wherein the feature application system comprises:
 a transformation system configured to apply (or means for applying) the set of weights to the set of features to transform the set of features into the set of derived features.

Example 12 is the speech system of any or all previous examples wherein the feature application system comprises:
 a feature combination system configured to combine (or means for combining) the set of derived features with the set of features to obtain a weighted combination of features, and wherein the encoder is configured to generate the speech processing result based on the weighted combination of features.

Example 13 is the speech system of any or all previous examples wherein the speech data is unseen speech data representing speech from a plurality of different speakers and wherein the encoder generates the speech processing result by clustering portions of the unseen speech data into clusters based on the set of derived features.

Example 14 is the speech system of any or all previous examples wherein the encoder generates the speech processing result by attributing the speech data to different speakers based on the set of derived features.

Example 15 is the speech system of any or all previous examples wherein the encoder indexes the speech data based on which of the different speakers is attributed the speech data.

Example 16 is the speech system of any or all previous examples wherein the encoder derives an interpretation of the speech data based on which of the plurality of different speakers is attributed the speech data.

Example 17 is the speech system of any or all previous examples wherein the encoder recognizes speech in the speech data based on the set of derived features.

Example 18 is a computer readable storage system that stores computer executable instructions which, when executed by the computer, cause the computer to perform a method, comprising:
 extracting (or means for extracting) a set of training feature vectors from speech training data that represents speech from a plurality of different, known speakers;
 generating (or means for generating) pairs of feature vectors from a same speaker and pairs of feature vectors from different speakers;
 training (or means for training) a neural network by applying the set of training features, through a weight matrix, to an input node layer of the neural network, and modifying network weights in the weight matrix based on an objective function of network outputs;
 extracting (or means for extracting) the network weights from the weight matrix of the trained neural network; and
 providing (or means for providing) the weights to a speech processing system.

Example 19 is the computer readable storage medium of any or all previous examples wherein training comprises:
 feeding (or means for feeding) the pairs of feature vectors into the neural network by feeding a first feature vector of each of the pairs of feature vectors through the weight matrix into nodes of a first bottleneck layer in the neural network and feeding a second feature vector of each of the pairs of feature vectors through the weight matrix into a nodes of a second bottleneck layer in the neural network.

Example 20 is the computer readable storage medium of any or all previous examples wherein training comprises:
 forcing (or means for forcing) an output layer of the neural network to indicate whether the pairs of feature vectors are drawn from speech of the same speaker or different speakers, based on an objective function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a feature extraction system configured to extract a set of training features from audio training data and generate pairs of feature vectors from a same audio source and pairs of feature vectors from different audio sources; and
a neural network training system configured to receive the pairs of feature vectors and train a neural network by applying the pairs of feature vectors through a weight matrix, to an input node layer of the neural network, modify the weight matrix based on an objective function of network outputs that indicate whether the pairs of feature vectors are from the same audio source or different audio sources, and to extract weights from the weight matrix and provide the weights to an audio processing system.

2. The computing system of claim 1 wherein the feature extraction system is configured to extract the pairs of feature vectors as feature vectors from speech of known speakers.

3. The computing system of claim 2 wherein the feature extraction system is configured to generate the pairs of feature vectors as pairs of feature vectors from the same speaker and pairs of feature vectors from different speakers.

4. The computing system of claim 3 wherein the input node layer of the neural network comprises:
a first bottleneck layer having a set of nodes; and
a second bottleneck layer having a set of nodes.

5. The computing system of claim 4 wherein the weight matrix ties weights on inputs to corresponding nodes of the first and second bottleneck layers together.

6. The computing system of claim 5 wherein the neural network training system comprises:
a training component that feeds the pairs of feature vectors into the neural network by feeding a first feature vector of each of the pairs of feature vectors through the weight matrix into the nodes of the first bottleneck layer and feeding a second feature vector of each of the pairs of feature vectors through the weight matrix into the nodes of the second bottleneck layer.

7. The computing system of claim 6 wherein the training component is configured to train the neural network by forcing an output layer of the neural network to indicate whether the pairs of feature vectors are drawn from speech of the same speaker or different speakers, based on the objective function.

8. The computing system of claim 7 and further comprising:
a feature generation system configured to apply the extracted weights to a set of features extracted from unseen speech data to obtain a set of derived features.

9. The computing system of claim 8 and further comprising:
a speech processing system configured to use the set of derived features in generating a speech processing result corresponding to the unseen speech data.

10. A speech system, comprising:
a feature extractor configured to receive speech signal data indicative of a speech signal and extract a set of features from the speech signal;
a feature application system configured to apply a set of weights, extracted from a weight matrix between an input of a neural network and a bottleneck layer of the neural network, to the set of features to transform the set of features into a set of derived features; and
an encoder configured to generate a speech processing result indicative of a characteristic of the speech signal, based on the set of derived features.

11. The speech system of claim 10 wherein the feature application system comprises:
a transformation system configured to apply the set of weights to the set of features to transform the set of features into the set of derived features.

12. The speech system of claim 11 wherein the feature application system comprises:
a feature combination system configured to combine the set of derived features with the set of features to obtain a weighted combination of features, and wherein the encoder is configured to generate the speech processing result based on the weighted combination of features.

13. The speech system of claim 10 wherein the speech data is unseen speech data representing speech from a plurality of different speakers and wherein the encoder generates the speech processing result by clustering portions of the unseen speech data into clusters based on the set of derived features.

14. The speech system of claim 13 wherein the encoder generates the speech processing result by attributing the speech data to different speakers based on the set of derived features.

15. The speech system of claim 14 wherein the encoder indexes the speech data based on which of the different speakers is attributed the speech data.

16. The speech system of claim 14 wherein the encoder derives an interpretation of the speech data based on which of the plurality of different speakers is attributed the speech data.

17. The speech system of claim 10 wherein the encoder recognizes speech in the speech data based on the set of derived features.

18. A computer readable storage medium that stores computer executable instructions which, when executed by the computer, cause the computer to perform a method, comprising:
extracting a set of training feature vectors from speech training data that represents speech from a plurality of different, known speakers;
generating pairs of feature vectors from a same speaker and pairs of feature vectors from different speakers;
training a neural network by applying the set of training features, through a weight matrix, to an input node layer of the neural network, and
modifying network weights in the weight matrix based on an objective function of network outputs;
extracting the network weights from the weight matrix of the trained neural network; and
providing the weights to a speech processing system.

19. The computer readable storage medium of claim 18 wherein training comprises:
feeding the pairs of feature vectors into the neural network by feeding a first feature vector of each of the pairs of feature vectors through the weight matrix into nodes of a first bottleneck layer in the neural network and feeding a second feature vector of each of the pairs of feature vectors through the weight matrix into a nodes of a second bottleneck layer in the neural network.

20. The computer readable storage medium of claim 19 wherein training comprises:
  forcing an output layer of the neural network to indicate whether the pairs of feature vectors are drawn from speech of the same speaker or different speakers, based on an objective function.

* * * * *